United States Patent
Sato

(10) Patent No.: US 6,798,456 B1
(45) Date of Patent: Sep. 28, 2004

(54) EXPOSURE PERIOD CONTROL DEVICE FOR ELECTRONIC STILL CAMERA

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 765 days.

(21) Appl. No.: 09/654,522

(22) Filed: Sep. 1, 2000

(30) Foreign Application Priority Data

Sep. 3, 1999 (JP) .......................................... P11-249748
Sep. 3, 1999 (JP) .......................................... P11-249767

(51) Int. Cl.[7] ........................... H04N 5/235; G03B 7/00
(52) U.S. Cl. ....................................... 348/362; 348/244
(58) Field of Search ............................... 348/241, 243, 348/244, 362

(56) References Cited

U.S. PATENT DOCUMENTS 3,792,648 A * 2/1974 Ishiguro ..................... 396/240
3,992,714 A   11/1976 Miyakawa
4,739,409 A * 4/1988 Baumeister ................. 348/244

* cited by examiner

*Primary Examiner*—Wendy R. Garber
*Assistant Examiner*—Matthew L Rosendale
(74) *Attorney, Agent, or Firm*—Greenblum & Bernstein, P.L.C.

(57) ABSTRACT

An exposure period control device comprises a thermo sensor that senses the temperature of an imaging device, such as a CCD. The thermo sensor faces the rear surface of the CCD. A maximum exposure period is controlled to be decreased as the temperature of the CCD increases. When it is supposed that the temperature is T° C., a maximum exposure period is $t_0$ at 0° C., and $7 \leq Th \leq 11$, the maximum exposure period $t_{max}$ is $$t_{max} = t_0 \times (1/2)^{T/Th}$$

When the value of the dark current occurring in a photodiode of the CCD becomes excessive, the maximum exposure period of the CCD controlled to be decreased. Therefore, the amount of the noise component occurring in a photographed image is reduced, so that the image quality is not affected.

20 Claims, 14 Drawing Sheets

EXPOSURE PERIOD CONTROL DEVICE FOR ELECTRONIC STILL CAMERA

BACKGROUND OF THE INVENTION

1. Field of the Invention

The present invention relates to a device, provided in an electronic still camera, to limit the maximum value of an exposure period.

2. Description of the Related Art

Conventionally, there is known an electronic still camera which can perform a long-term exposure which is 10 and a few seconds, for example, such as a bulb photographing operation. The electronic still camera is provided with an imaging device such as a CCD, in which an electronic charge, corresponding to a subject image formed on the light-receiving surface, is accumulated. The amount of the accumulated electronic charge is controlled by adjusting the opening degree of an aperture and shutter speed which is an exposure period.

On the other hand, in the imaging device, when the temperature becomes too high, the amount of dark current generated in the photo-diode of the imaging device increases, so that the influence of the dark current becomes excessive when the exposure period is long, causing the noise component generated in the photographed image to increase. Namely, in a photograph in which a long-time exposure is carried out, the influence of the dark current is large, and thus the quality of the photographed image is easily affected.

SUMMARY OF THE INVENTION

Therefore, an object of the present invention is to provide an exposure period control device, which reduces the influence of noise occurring in a photographed image due to dark current, so that the image quality is not affected.

Another object of the present invention is to provide an exposure period control device, which can inform the photographer that the influence of noise might occur in the photographed image.

According to the present invention, there is provided an exposure period control device for an electronic still camera, comprising a thermo sensor and a maximum exposure period control processor. The thermo sensor senses the temperature of an imaging device. The maximum exposure period control processor limits the maximum exposure period for an automatic exposure control to a value corresponding to the first temperature.

Further, according to the present invention, there is provided an exposure period control device for an electronic still camera, which can perform a long-time exposure, the exposure period control device comprising a temperature sensing processor and a warning processor. The temperature sensing processor senses the temperature of the environment where the electronic still camera is used. The warning processor obtains a maximum exposure period for long-time exposure, in accordance with the temperature, to output a warning signal corresponding to the maximum exposure period.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
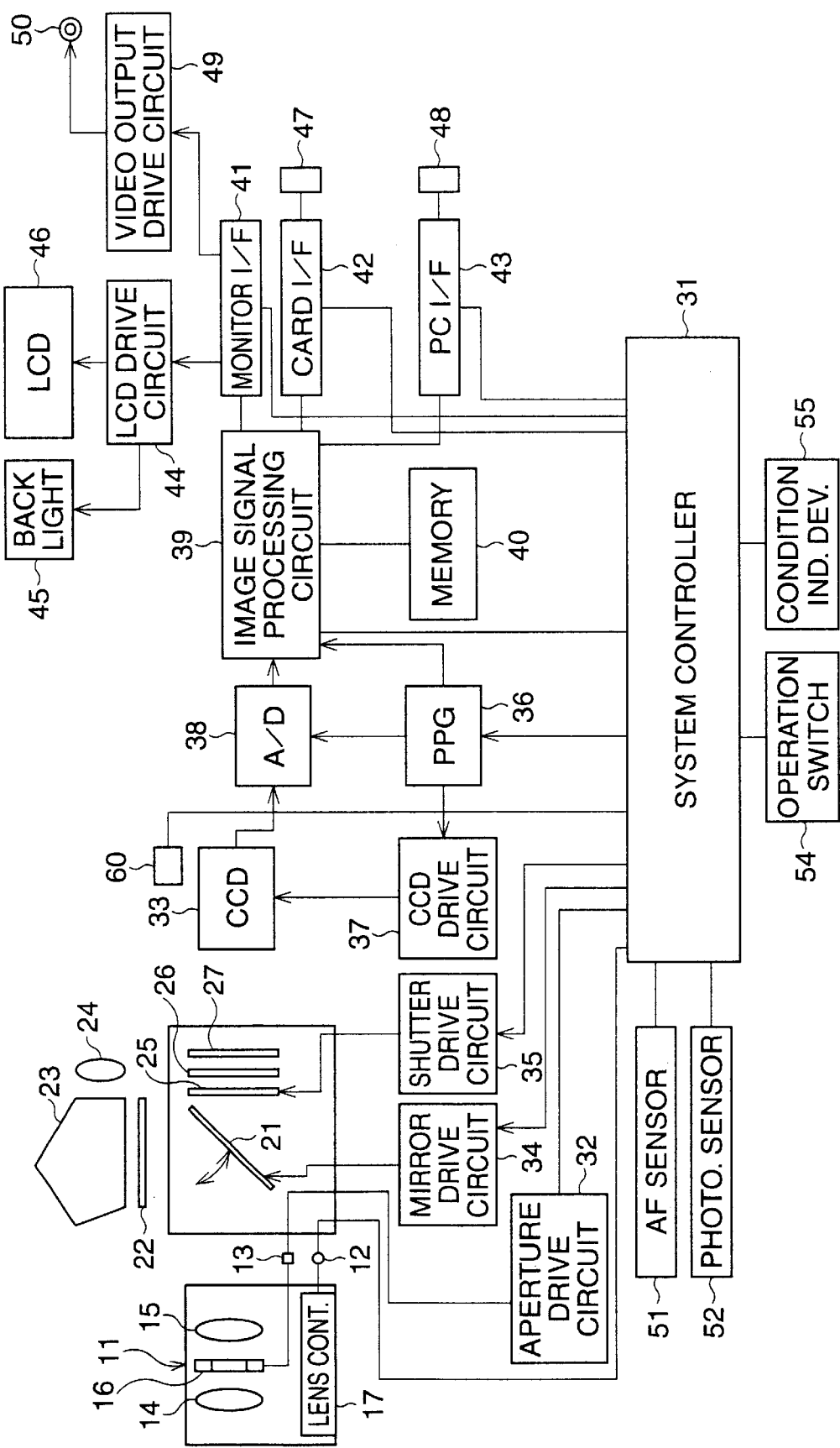
FIG. 1 is a block diagram of an electronic still camera provided with an exposure period control device to which a first embodiment of the present invention is applied.

The present invention will be described below with reference to the embodiments shown in the drawings.

FIG. 1 is a block diagram of an electronic still camera provided with an exposure period control device to which a first embodiment of the present invention is applied.

The electronic still camera is a single-lens reflex camera, and an interchangeable lens 11 is electrically connected to an electric circuit provided in the camera body through mount pins 12 and 13. A front lens group 14 and a rear lens group 15 are mounted in a lens barrel of the interchangeable lens 11, and an aperture 16 is provided between the lens groups 14 and 15. Each of the lens groups 14 and 15 is displaced in the optical axis direction under control of a lens control circuit 17, so that a focusing adjustment is carried out. The lens control circuit 17 is operated in accordance with a control signal transmitted through the mount pin 12 from the system controller 31 provided in the camera body. The aperture 16 is operated in accordance with a control signal transmitted through the mount pin 13 from an aperture drive circuit 32 provided in the camera body, so that the opening degree of the aperture 16 is adjusted. The aperture drive circuit 32 is controlled by the system controller 31.

In the camera body, a quick return mirror 21 is disposed on the optical axis of the lens groups 14 and 15. The quick return mirror 21 is rotatable between an inclined state shown in the drawing and a horizontal state in which the quick return mirror 21 is rotated upward. A focusing glass 22 is provided above the quick return mirror 21, and a pentagonal prism 23 is arranged above the focusing glass 22. An eyepiece lens 24 of a view-finder is disposed behind the pentagonal prism 23.

A shutter 25 is provided behind the quick return mirror 21, and an infrared cut filter 26 and an optical low-pass filter 27 are arranged behind the shutter 25. A CCD (i.e., an imaging device) 33 is provided behind the optical low-pass filter 27.

Namely, the quick return mirror 21, the shutter 25, the infrared cut filter 26 and the CCD 33 are aligned on the optical axis of the lens groups 14 and 15. A thermo sensor 60 sensing the temperature of the CCD 33 is provided close to the CCD 33.

A rotating operation of the quick return mirror 21 is driven by a mirror drive circuit 34, and an open-close operation of the shutter 25 is driven by the shutter drive circuit 35. The mirror drive circuit 34 and the shutter drive circuit 35 are controlled by the system controller 31.

Usually, the mirror 21 is set to an inclined state, so that light passing through the interchangeable lens 11 is led to the pentagonal prism 23. In this state, the shutter 25 is closed, so that an optical path to the CCD 33 is shut or closed. Conversely, when a photographing operation is carried out, the mirror 21 is upwardly rotated under control of the mirror drive circuit 34, and is set to the horizontal state. With the rotation of the mirror 21, the shutter 25 opens under control of the shutter drive circuit 35, so that light passing through the interchangeable lens 11 radiated on a light receiving surface of the CCD 33. Namely, an image obtained through the lens groups 14 and 15 is formed on the light receiving surface, and thus an image signal corresponding to the image is generated in the CCD 33.

A pulse pattern generator (PPG) 36 is connected to the system controller 31, so that the pulse pattern generator 36 generates various kinds of pulse signals under control of the system controller 31. Based on these pulse signals, the CCD drive circuit 37, an A/D converter 38 and an image signal processing circuit 39 are driven, and an operation of the CCD 33 is controlled by the CCD drive circuit 37. Namely, the image signal read from the CCD 33 is converted to a digital image data by the A/D converter 38, and is then subjected to a predetermined process by the image signal processing circuit 39. A memory 40, having a capacity large enough to store a frame amount of digital image data, is connected to the image signal processing circuit 39.

A monitor interface 41, a card interface 42 and a PC interface 43 are connected to the image signal processing circuit 39. These interfaces 41, 42 and 43 are controlled by the system controller 31. A back light 45 and a liquid crystal display (LCD) 46 are connected to the monitor interface 41 through a liquid crystal display drive circuit 44, and a video output terminal 50 is connected to the monitor interface 41 through a video output drive circuit 49. Based on the image data read from the memory 40, the liquid crystal display circuit 44 is controlled, so that an image is indicated by the liquid crystal display 46. The image data is converted into a predetermined format in the video output drive circuit 49, and output to an external video device through the video output terminal 50. A card connector 47 is connected to the card interface 42, and a PC connector 48 is connected to the PC interface 43. An IC memory card can be mounted to the card connector 47, and a personal computer can be connected to the PC connector 48.

An AF sensor 51 and a photometry sensor 52 are connected to the system controller 31. The AF sensor 51 has a known construction, by which a focusing condition of the lens groups 14 and 15 is sensed. A photometry is performed using the photometry sensor 52, so that an opening degree of the aperture 16 in an exposure and an electric charge accumulation period (i.e., an exposure period) of the CCD 33 are determined.

An operation switch 54 and a condition indicating device 55 are connected to the system controller 31. The operation switch 54 is provided with a switch such as a photometry switch and a release switch. The photometry switch is turned ON by partly depressing the release button (not shown), so that a photometry is carried out through the photometry sensor 52. The release switch is turned ON by fully depressing the release button, so that the shutter 25 is open and closed. Namely, the CCD 33 is exposed, and thus an image signal corresponding to an image is generated in the CCD 33. The condition indicating device 55 is provided with a liquid crystal display, by which various setting conditions of the electronic still camera are indicated.

Figure 2:
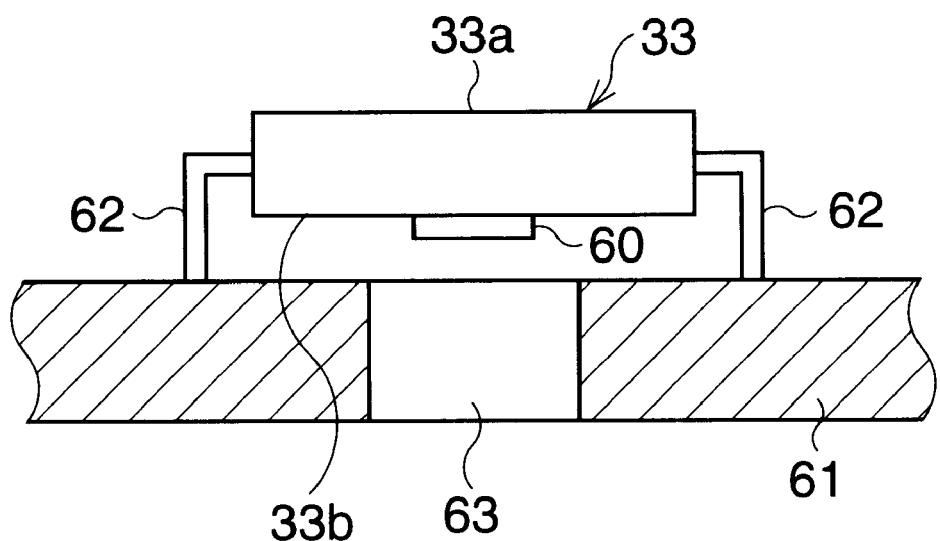
FIG. 2 is a sectional view showing an example of a structure in which a thermo sensor is attached to a CCD.

FIG. 2 shows an example of an attaching structure of the thermo sensor 60.

The CCD 33 is disposed parallel to a substrate 61, and terminals 62 projected from both sides of the CCD 33 are fixed on a surface of the substrate 61. The thermo sensor 60 is adhered on a rear surface 33b, which is opposite to a light-receiving surface 33a of the CCD 33 and faces the substrate 61. An opening 63, for leading cooling air around the CCD 33, is formed in a portion of the substrate 61, which faces the thermo sensor 60.

Figure 3:
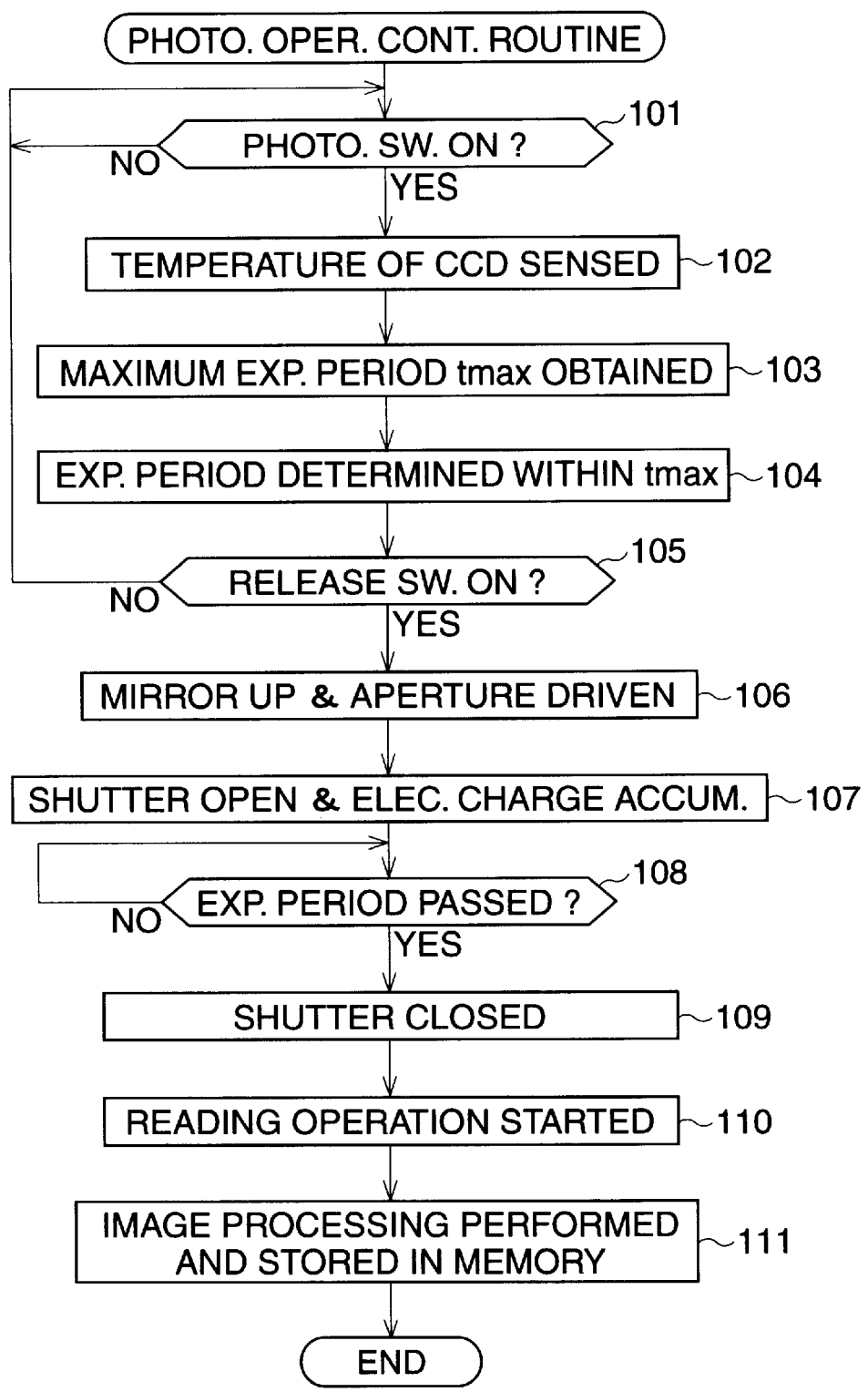
FIG. 3 is a flow chart showing a photographing operation control routine.

FIG. 3 is a flow chart showing a photographing operation control routine of the electronic still camera.

In Step 101, it is determined whether the photometry switch is turned ON. When the photometry switch is changed to an ON-condition, Step 102 is executed, in which the temperature T° C. of the CCD 33 is sensed by the thermo sensor 60. In Step 103, according to formula (1), a maximum exposure period at the temperature T° C. in an automatic exposure control, i.e. the longest exposure period which can be carried out, is obtained.

$$t_{max} = t_0 \times (\tfrac{1}{2})^{T/Th} \qquad (1)$$

Wherein $t_0$ is a maximum exposure period at 0° C., and $7 \leq Th \leq 11$. In the embodiment, Th=10, and therefore $$t_{max} = t_0 \times (\tfrac{1}{2})^{T/10} \qquad (1')$$

In Step 104, an exposure calculation is performed. Namely, based on a photometry value obtained by the photometry sensor 52, the opening degree of the aperture 16 and the exposure period are calculated. At this time, the exposure period is determined in such a manner that the exposure period does not exceed the maximum exposure period $t_{max}$. Note that the detail of the exposure calculation will be described later.

In Step 105, it is determined whether the release switch is turned ON. When it is determined that the release switch is not turned ON, the process goes back to Step 101. When it is determined that the release switch is turned ON, the process goes to Step 106. In Step 106, the quick return mirror 21 is rotated upward to the horizontal state, and the opening degree of the aperture 16 is set to a value calculated in Step 104. In Step 107, the shutter 25 is opened, so that an electric charge accumulation is started in the CCD 33. In Step 108, it is determined whether the exposure period calculated in Step 104 has passed. When the exposure period has passed, the process moves from Step 108 to Step 109, in which the shutter 25 is closed, and the quick return mirror 21 is rotated downward to the inclined state.

In Step 110, a reading operation of the electric charge accumulated in the CCD 33, i.e. the image signal is started. In Step 111, the digital image data corresponding to the image signal is subjected to an image process such as an interpolation, a color correction, a gamma correction and so on, in the image signal processing circuit 39, and then stored in the memory 40. Thus, the photographing operation control routine ends.

The exposure calculation routine executed in Step 104 is described below.

Figure 4:
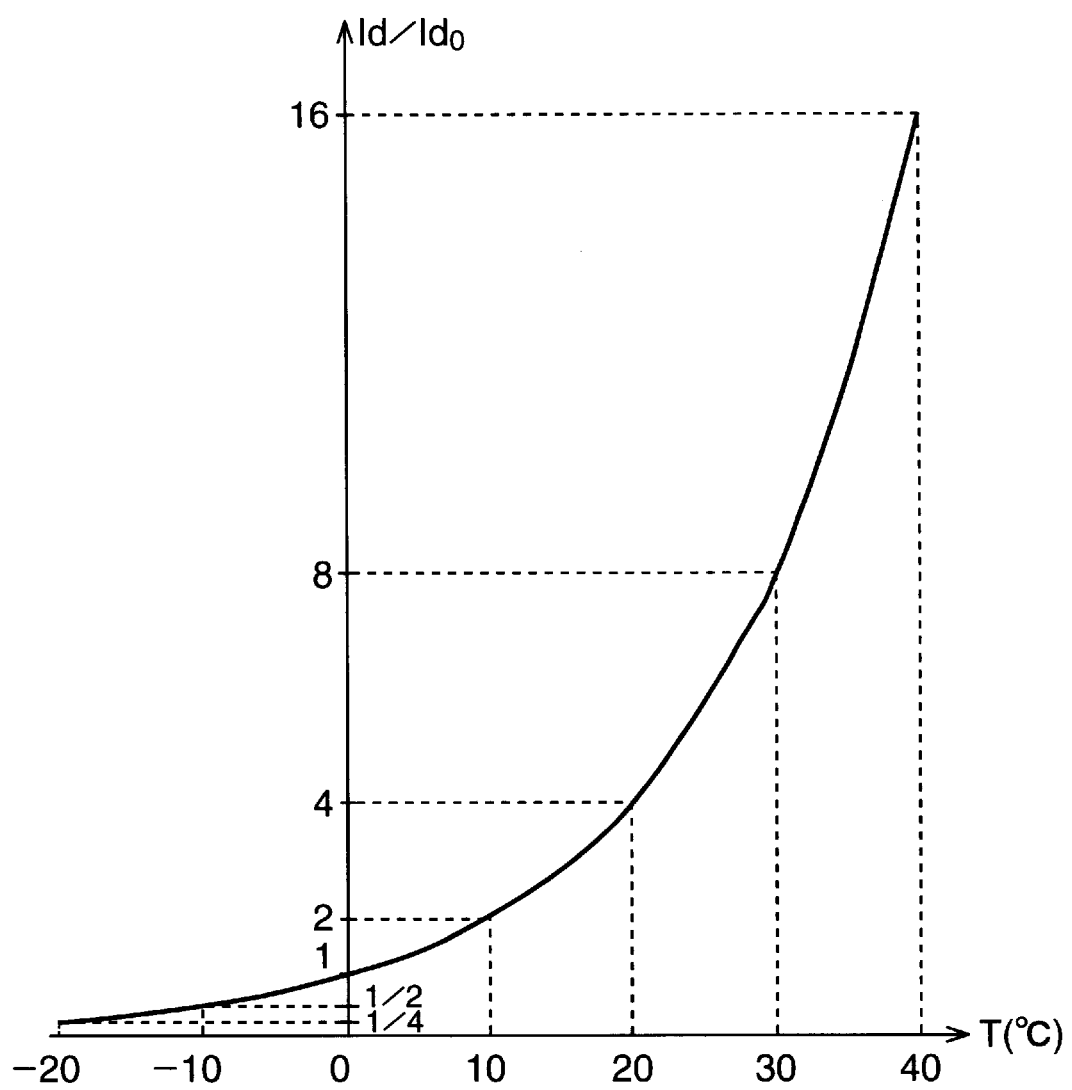
FIG. 4 is a view showing an example of the relationship between temperature and dark current.

In the CCD 33, even if light is completely eliminated, a dark current occurs, and the amount of the dark current is changed in relation to the temperature of the CCD 33. An example of a relationship between the temperature of the CCD 33 and the dark current is shown in FIG. 4. As understood from the drawing, when it is supposed that the value of the dark current at the temperature T° C. is Id and the value of the dark current at the temperature 0° C. is $Id_0$, the dark current ratio $Id/Id_0$ is less than 1 when the temperature is below 0° C. The dark current ratio is drastically increased as the temperature T° C. rises, and becomes approximately double when the temperature T° C. rises by 8–10° C.

Figure 5:
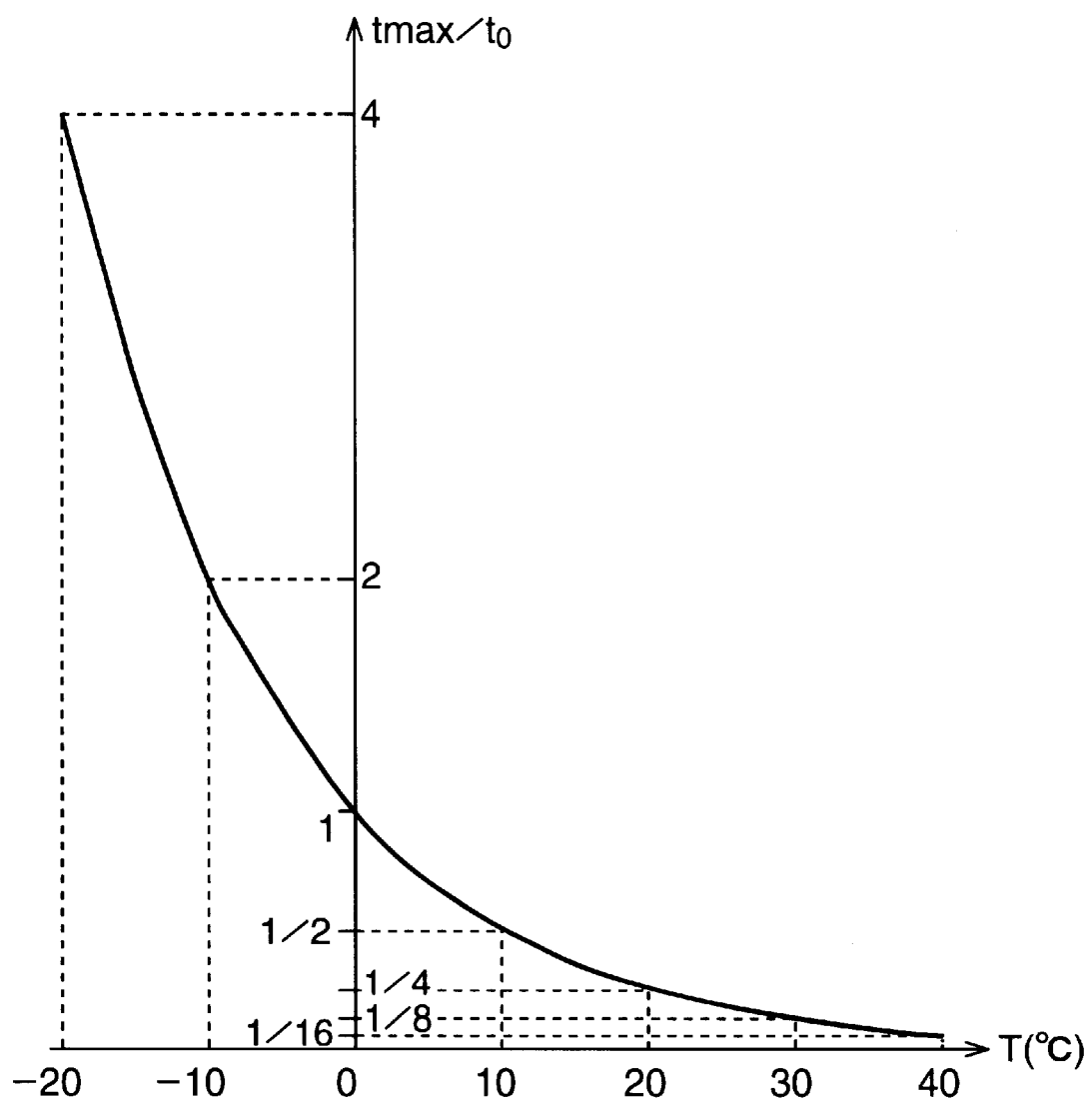
FIG. 5 is a view showing the relationship between temperature and a maximum exposure period.

In the embodiment, the maximum exposure period $t_{max}$ is determined according to formula (1'), and the relationship between the temperature and the maximum exposure period ratio $t_{max}/t_0$ is as shown in FIG. 5. Namely, as the temperature rises, the ratio $t_{max}/t_0$ drastically decreases.

Figure 6A:
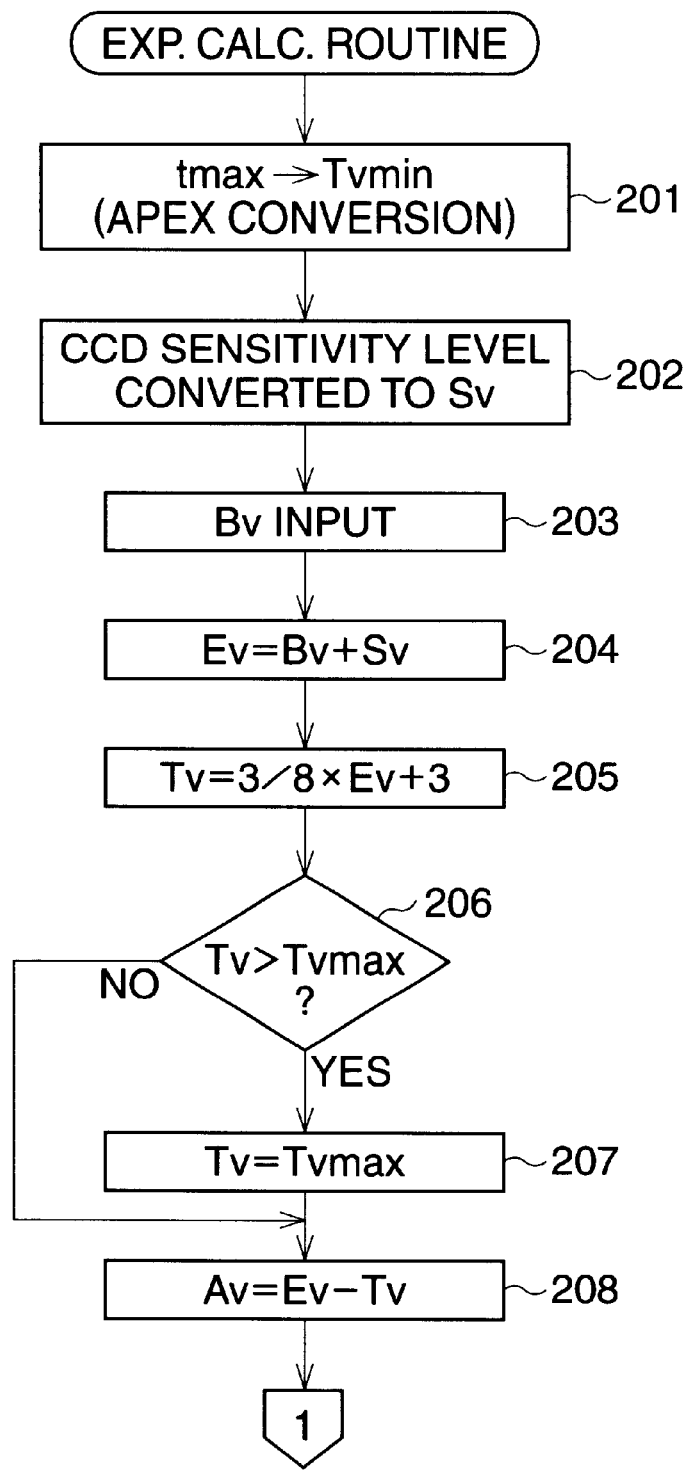
FIGS. 6A and 6B how a flow chart of an exposure calculation routine.
Figure 6B:
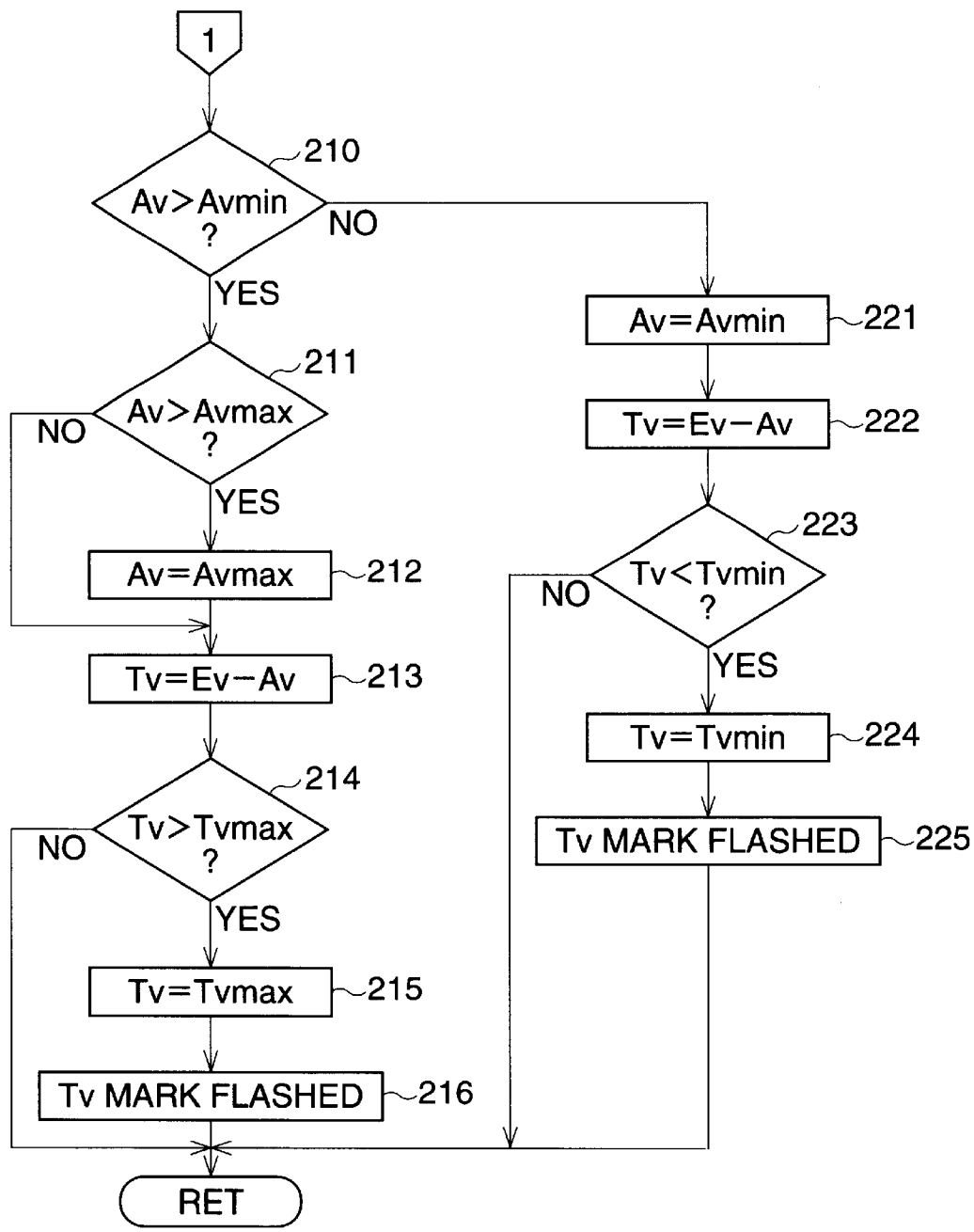

FIGS. 6A and 6B show a flow chart of the exposure calculation routine.

In Step 201, the maximum exposure period $t_{max}$ is converted into an APEX value $Tv_{min}$. Namely, the APEX value $Tv_{min}$ becomes short as the exposure period becomes long, and the maximum exposure period $t_{max}$ corresponds to the minimum value of Tv. Note that the reason of the conversion to the APEX value is that, while the maximum exposure period $t_{max}$ is indicated in real time, an aperture value and a shutter speed (i.e., an exposure period) are calculated using the APEX value. In Step 202, a sensitive level of the CCD 33 (i.e., AGC level of a video signal) is converted into an APEX value Sv.

In Step 203, based on data obtained from the photometry sensor 52, a photometry value Bv is obtained. In Step 204, Ev value is obtained according to formula (2).

$$Ev=Bv+Sv \quad (2)$$

In Step 205, Ev obtained in Step 204 is substituted for formula (3) indicating an inclined portion of a program diagram, so that Tv is obtained.

$$Tv=(\tfrac{3}{8}) \times Ev+3 \quad (3)$$

In Step 206, it is determined whether Tv is greater than a maximum value $Tv_{max}$ which is predetermined. When Tv is greater than the maximum value $Tv_{max}$, Step 207 is executed in which Tv is replaced with the maximum value $Tv_{max}$. Conversely, when Tv is not greater than the maximum value $Tv_{max}$, Step 207 is skipped so that Step 208 is executed, in which Av is obtained according to formula (4).

$$Av=Ev-Tv \quad (4)$$

In Step 210, it is determined whether Av is greater than a minimum value $Av_{min}$ which is predetermined. When Av is greater than the minimum value $Av_{min}$, the process goes to Step 211, and when Av is not greater than the minimum value $Av_{min}$, the process goes to Step 221.

In Step 211, it is determined whether Av is greater than a maximum value $Av_{max}$ which is predetermined. When Av is greater than the minimum value $Av_{max}$, Step 212 is executed in which Av is replaced with the maximum value $Av_{max}$. Conversely, when Av is not greater than the maximum value $Av_{max}$, Step 212 is skipped so that Step 213 is executed, in which Tv is obtained according to formula (5).

$$Tv=Ev-Av \quad (5)$$

In Step 214, it is determined whether Tv is greater than the maximum value $Tv_{max}$. When Tv is greater than the maximum value $Tv_{max}$, Step 215 is executed in which Tv is replaced with the maximum value $Tv_{max}$. Then, in Step 216, a predetermined mark, indicating that Tv is limited by the maximum value $Tv_{max}$, is flashed on a screen of the condition indicating device 55, and this routine ends. Namely, in this case, the exposure period is limited to the minimum value (i.e., the maximum shutter speed) corresponding to the maximum value $Tv_{max}$. On the other hand, when it is determined in Step 214 that Tv is not greater than the maximum value $Tv_{max}$, Steps 215 and 216 are skipped, and thus this routine ends.

In Step 221, Av is replaced with the minimum value $Av_{min}$. In Step 222, Tv is obtained according to formula (5). In Step 223, it is determined whether Tv is less than the minimum value $Tv_{min}$. When Tv is less than the minimum value $Tv_{min}$, i.e., when the exposure period corresponding to Tv is longer than the maximum exposure period $t_{max}$, Step 224 is executed in which Tv is replaced with the minimum value $Tv_{min}$. Namely, the maximum exposure period $t_{max}$ is set to the exposure period. In Step 225, a predetermined mark, indicating that Tv is limited by the minimum value $Tv_{min}$, is flashed on the screen of the condition indicating device 55, and this routine ends. Conversely, when it is determined in Step 223 that Tv is not less than the maximum value $Tv_{min}$, Steps 224 and 225 are skipped, and thus this routine ends.

As described above, according to the embodiment, as the temperature of the CCD 33 increases, the maximum exposure period of the automatic exposure control is controlled to become shorter according to formula (1'). Namely, when the value of the dark current occurring in the photo-diode of the CCD 33 becomes large, the maximum exposure period is limited. Therefore, the amount of noise components occurring in the photographed image is restricted, and thus, the image quality is prevented from decreasing, and the exposure period corresponding to the temperature is maintained as long as possible.

Note that the maximum exposure period cannot be necessarily calculated according to formula (1'). For example, it is possible that a relationship between a temperature and a maximum exposure period is stored in the memory 40 in a form of a table, and the maximum exposure period is obtained by referring to an address corresponding to the temperature.

Figure 7:
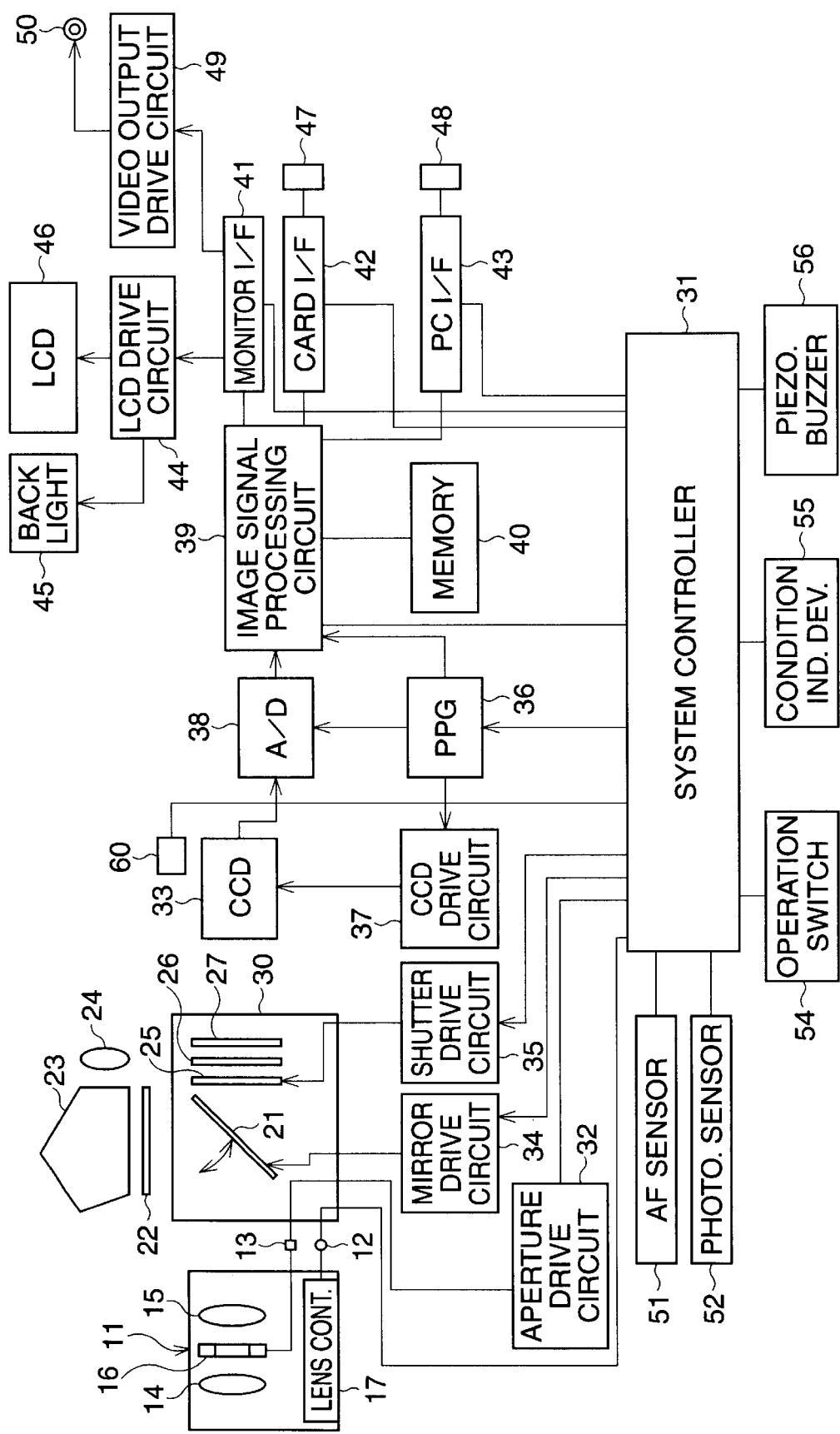
FIG. 7 is a block diagram of an electronic still camera provided with an exposure period control device to which a second embodiment of the present invention is applied.

FIG. 7 is a block diagram of an electronic still camera provided with an exposure period control device to which a second embodiment of the present invention is applied. In the second embodiment, a piezoelectric buzzer 56 is connected to the system controller 31, together with the operation switch 54 and the condition indicating device 55. The piezoelectric buzzer 56 is provided for generating various kinds of warnings. The other constructions are the same as those of the first embodiment.

Figure 8A:
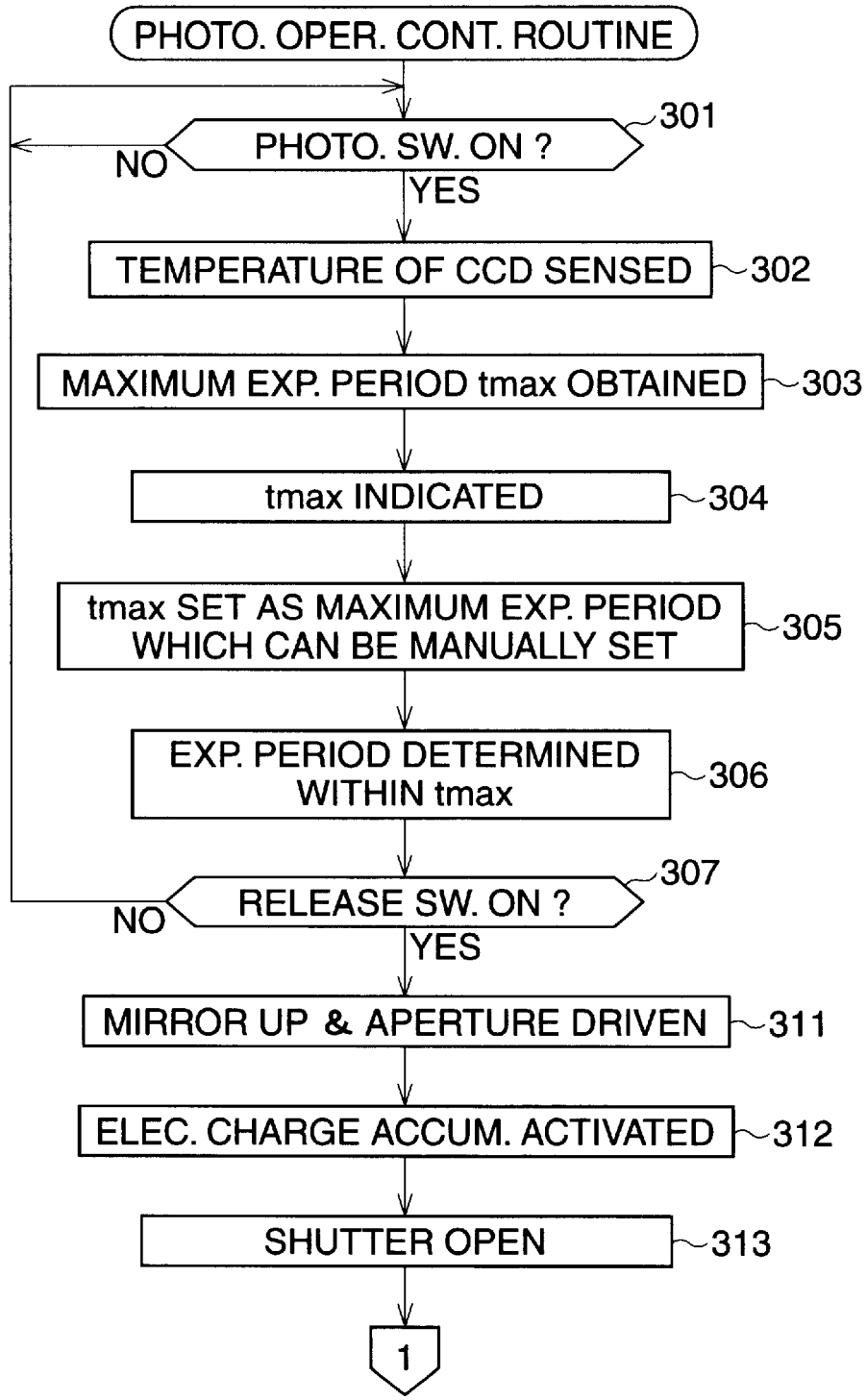
FIGS. 8A, 8B and 8C, show a flow chart of a photographing operation control routine of the second embodiment.
Figure 8B:
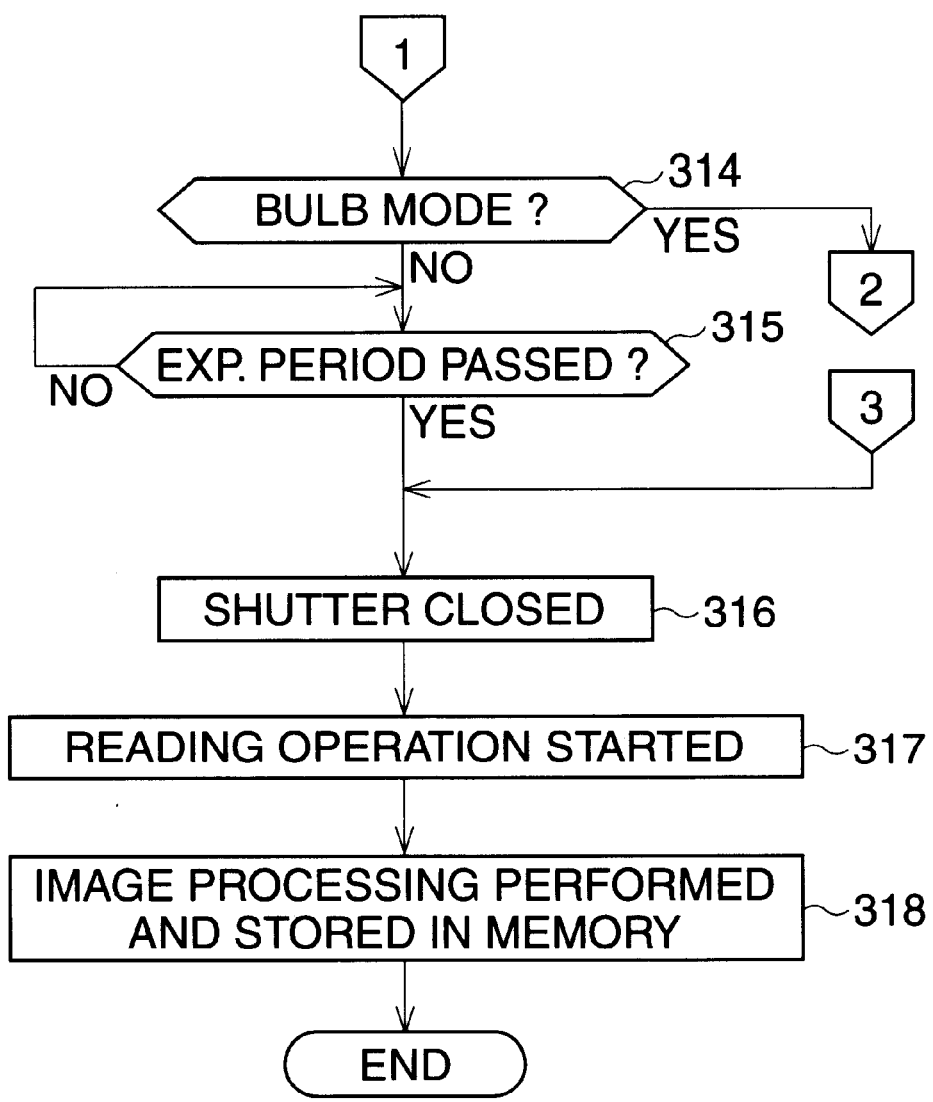
Figure 8C:
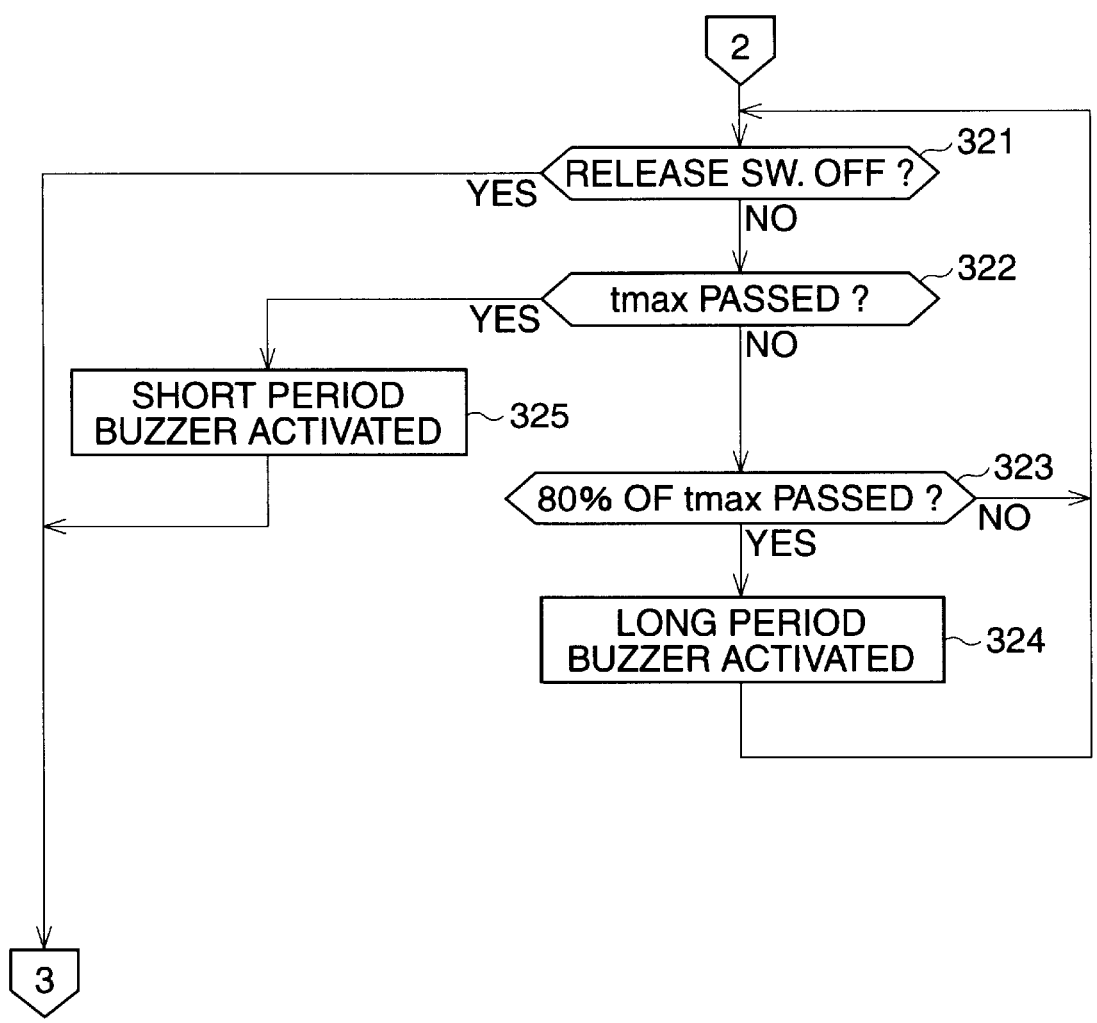

FIGS. 8A, 8B and 8C show a flow chart of a photographing operation control routine of the second embodiment.

The contents of Steps 301, 302 and 303 are the same as those of Steps 101, 102 and 103 of FIG. 3.

In Step 304, the value of the maximum exposure period $t_{max}$ is indicated on the screen of the condition indicating device 55. In Step 305, the maximum exposure period $t_{max}$ is stored in a memory provided in the system controller 31. The maximum exposure period $t_{max}$ is used to indicate the maximum exposure period which can be manually set in a photographing operation. In Step 306, an exposure calculation is carried out. Namely, based on a photometry value obtained by the photometry sensor 52, the opening degree of the aperture 16 and the exposure period are calculated. At this time, the exposure period is determined in such a manner that the exposure period does not exceed the maximum exposure period $t_{max}$. Note that the contents of the exposure calculation are the same as those of Step 104 of FIG. 3.

It is determined in Step 307 whether the release switch is turned ON. When it is determined that the release switch is not turned ON, the process goes back to Step 301. When it is determined that the release switch is turned ON, the process goes to Step 311. In Step 311, the quick return mirror 21 is rotated upward to the horizontal state, and the opening ah degree of the aperture 16 is set to a value calculated in Step 306. In Step 312, an electrical control to the CCD 33 is started so that an accumulating operation of an electronic charge can be performed. In Step 313, the shutter 25 is opened, so that an electric charge accumulation is started in the CCD 33.

In Step 314, it is determined whether the bulb mode is set. When the bulb mode is set, the process goes to Step 321. When the bulb mode is not set, the process goes to Step 315. In Step 315, it is determined whether the exposure period calculated in Step 306 has passed. When the exposure period has passed, the process moves from Step 315 to Step 316. The contents of Steps 316, 317 and 318 are the same as those of Steps 109, 110 and 111 of FIG. 3.

On the other hand, in Step 321, it is determined whether the release switch is turned OFF. When the release switch is turned OFF, the process goes to Step 316, so that the operations described above are performed. Conversely, when the release switch is kept turning ON, the process goes to Step 322, so that a buzzer sound is activated in accordance with the length of the exposure period which is being carried out.

In Step 322, it is determined whether the maximum exposure period $t_{max}$ has passed since the shutter 25 has opened. When the maximum exposure period $t_{max}$ has not passed, Step 323 is executed in which it is determined whether 80% of the maximum exposure period $t_{max}$ has passed. When 80% of the maximum exposure period $t_{max}$ has not passed, the process goes back to Step 321. Conversely, when 80% of the maximum exposure period $t_{max}$ has passed, the process goes to Step 324. In Step 324, a buzzer sound of a continuous period, such as "peep, peep, peep, . . . ", is output by the piezoelectric buzzer 56, and the process goes back to Step 321. The buzzer sequence is continuously activated while Steps 321 through 324 are executed.

If the release switch is turned OFF while the buzzer sequence is activated, the process goes from Step 321 to Step 316. Conversely, if it is determined in Step 322 that the maximum exposure period $t_{max}$ has passed while the buzzer sequence is activated, the process goes to Step 325, in which a buzzer sound of a short period, such as "pip, pip, pip, . . . ", is output by the piezoelectric buzzer 56, and the process goes back to Step 316.

Thus, when the exposure period exceeds 80% of the maximum exposure period $t_{max}$ in a bulb photographing operation, Step 324 is executed in which a preliminary warning signal (i.e., a long period buzzer sound), indicating that the maximum exposure period $t_{max}$ is approaching, is activated. Then, when the exposure period exceeds the maximum exposure period $t_{max}$, Step 325 is executed in which a warning signal (i.e., a short period buzzer sound), indicating that the maximum exposure period $t_{max}$ has passed, is activated, and the process then goes to Step 316.

Namely, the exposure operation is compulsorily terminated, and the image data is stored in the memory 40.

As described above, in the second embodiment, as the temperature of the CCD 33 increases, the maximum exposure period, in a long-time exposure, such as a bulb photographing operation, is controlled according to formula (1') so as to decrease. Namely, when the value of a dark current occurring in a photo-diode of the CCD 33 increase, the maximum exposure period is reduced. Further, in the bulb photographing operation, when the maximum exposure period is approaching, a warning is activated, and when the maximum exposure period has passed, a warning indicating the passing of the maximum exposure period is activated and the photographing operation is compulsorily terminated. Therefore, the same effect as the first embodiment can be obtained.

Figure 9:
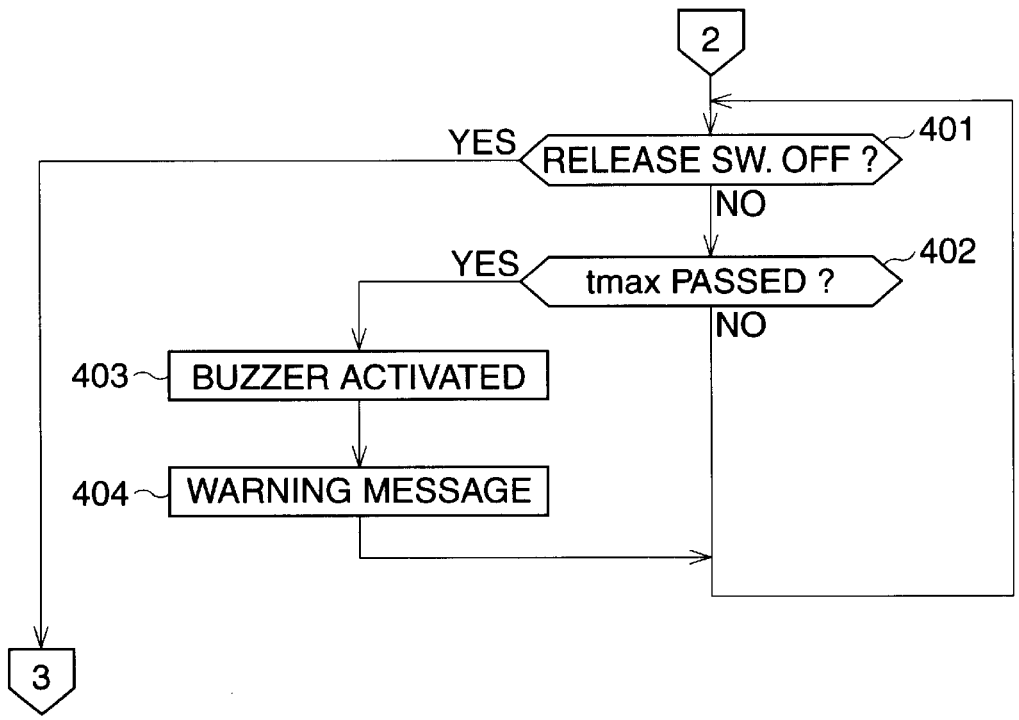
FIG. 9 is a main part of a flow chart of a photographing operation control routine of a third embodiment.

FIG. 9 is a main part of a flow chart of a photographing operation control routine of a third embodiment, and corresponds to the flow chart shown in FIG. 8C. Namely, Step 401 is executed when it is determined in Step 314 of FIG. 8B that the bulb mode is set. The process goes to Step 316 of FIG. 8B when it is determined in Step 401 that the release switch is turned 'OFF'. The other constructions are the same as that of the second embodiment.

In Step 401, it is determined whether the release switch is switched to 'OFF'. When the release switch is switched to 'OFF', the process goes to Step 316 (see FIG. 8B), and when the release switch is kept 'ON', Step 402 is executed, in which it is determined whether the maximum exposure period $t_{max}$ has passed since the shutter 25 was opened in Step 313 (see FIG. 8A). If the maximum exposure period $t_{max}$ has not passed, the process goes back to Step 401, and when the maximum exposure period $t_{max}$ has passed, Step 403 is executed in which a buzzer sound is output by the piezoelectric buzzer 56. Then, in Step 404, a warning (i.e., a warning signal or a visual warning indication), indicating that the photographing operation is exceeding the maximum exposure period $t_{max}$, is flashed on the screen of the condition indicating device 55.

After that, when it is determined in Step 401 that the release switch is switched to 'OFF', the process goes to Step 316. A post-process for the photographing operation is carried out, and thus image data is stored in the memory 40.

Therefore, according to the third embodiment, the effect, which is the same as that of the second embodiment, is obtained. Further, in the third embodiment, a bulb photographing operation can exceed the maximum exposure period $t_{max}$, and a warning is indicated on the screen of the condition indicating device 55. Accordingly, the photographer can choose to stop the photographing operation.

Figure 10:
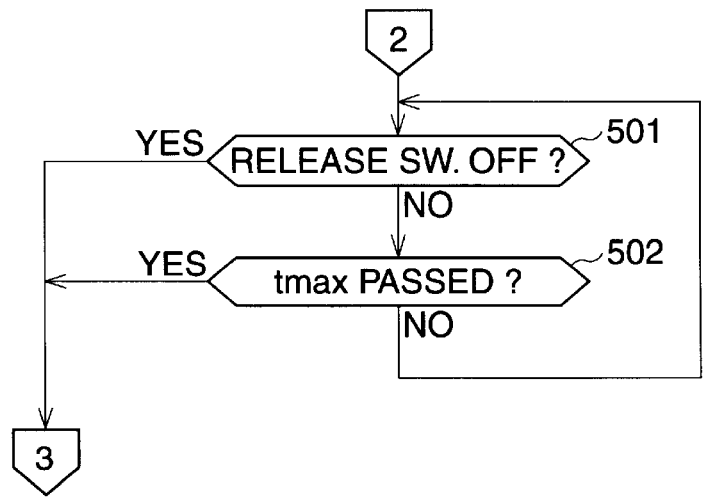
FIG. 10 is a main part of a flow chart of a photographing operation control routine of a fourth embodiment.

FIG. 10 is a main part of a flow chart of a photographing operation control routine of a fourth embodiment, and corresponds to the flow chart shown in FIG. 8C, similarly to the flow chart shown in FIG. 9. The other constructions are the same as that of the second embodiment.

In Step 501, it is determined whether the release switch is switched to 'OFF'. When the release switch is switched to 'OFF', the process goes to Step 316 (see FIG. 8B), and when the release switch is kept 'ON', Step 502 is executed, in which it is determined whether the maximum exposure period $t_{max}$ has passed since the shutter 25 is open in Step 313 (see FIG. 8A). When the maximum exposure period $t_{max}$ has not passed, the process goes back to Step 501, and when the maximum exposure period $t_{max}$ has passed, the process goes to Step 316 (see FIG. 8B), so that the bulb photographing operation is terminated.

Therefore, according to the fourth embodiment, the effect, which is the same as that of the second embodiment, is obtained. Further, in the fourth embodiment, since neither a warning message nor preliminary warning signal is output, the control of the device is simple.

Figure 11:
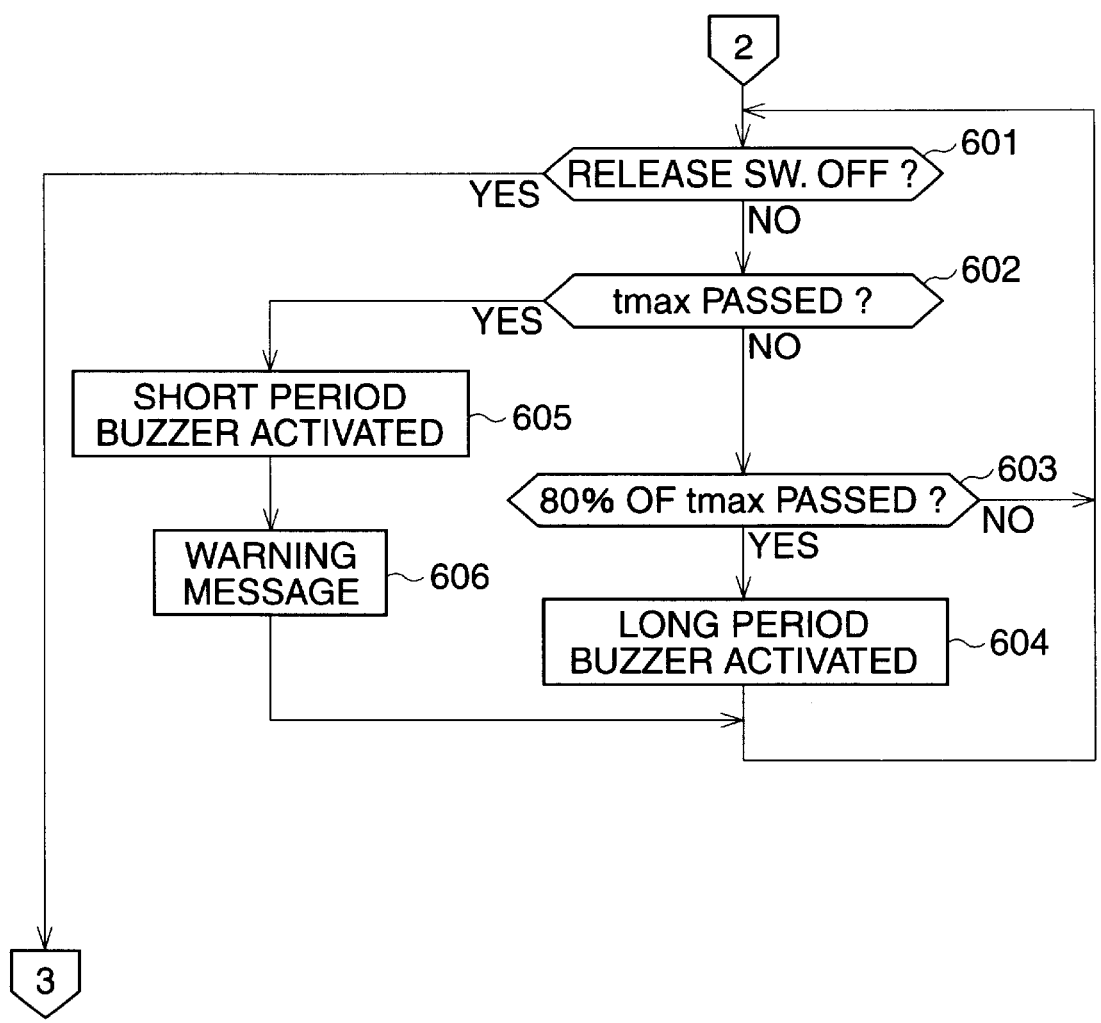
FIG. 11 is a main part of a flow chart of a photographing operation control routine of a fifth embodiment.

FIG. 11 is a main part of a flow chart of a photographing operation control routine of a fifth embodiment, and corresponds to the flow chart shown in FIG. 8C, similarly to the flow charts shown in FIGS. 9 and 10. The other constructions are the same as that of the second embodiment.

In Step 601, it is determined whether the release switch is switched to 'OFF'. When the release switch is switched to 'OFF', the process goes to Step 316 (see FIG. 8B), and when the release switch is kept 'ON', Step 602 is executed, in which it is determined whether the maximum exposure period $t_{max}$ has passed since the shutter 25 has opened in Step 313 (see FIG. 8A). When the maximum exposure period $t_{max}$ has not passed, Step 603 is executed, in which it is determined whether 80% of the maximum exposure period $t_{max}$ has passed. When 80% of the maximum exposure period $t_{max}$ has not passed, the process goes back to Step 601, and when 80% of the maximum exposure period $t_{max}$ has passed, the process goes to Step 604. Namely, a buzzer sound of a 'long' period, such as "peep, peep, peep, . . . ", is output by the piezoelectric buzzer 56, and the process goes back to Step 601. The buzzer sound is continuously activated while Steps 601 through 604 are executed.

When the release switch is switched to 'OFF' during the 'long' buzzer sound is activated, the process goes from Step 601 to Step 316 (see FIG. 8B). Conversely, when it is determined in Step 602 that the maximum exposure period $t_{max}$ has passed during the 'long' buzzer sound is output, Step 605 is executed in which a buzzer sound of a 'short' period, such as "pip, pip, pip, . . . ", is output by the piezoelectric buzzer 56. Then, in Step 606, a warning, indicating that the photographing operation has exceeded the maximum exposure period $t_{max}$, is flashed on the screen of the condition indicating device 55, and the process goes back to Step 601.

Therefore, according to the fifth embodiment, the effect, which is the same as that of the second embodiment, is obtained. Further, in the fifth embodiment, a bulb photographing operation can be performed over (or exceeding) the maximum exposure period $t_{max}$ and, in this case, the warning is indicated on the screen of the condition indicating device 55. Accordingly, the photographer can choose to stop the photographing operation.

Figure 12:
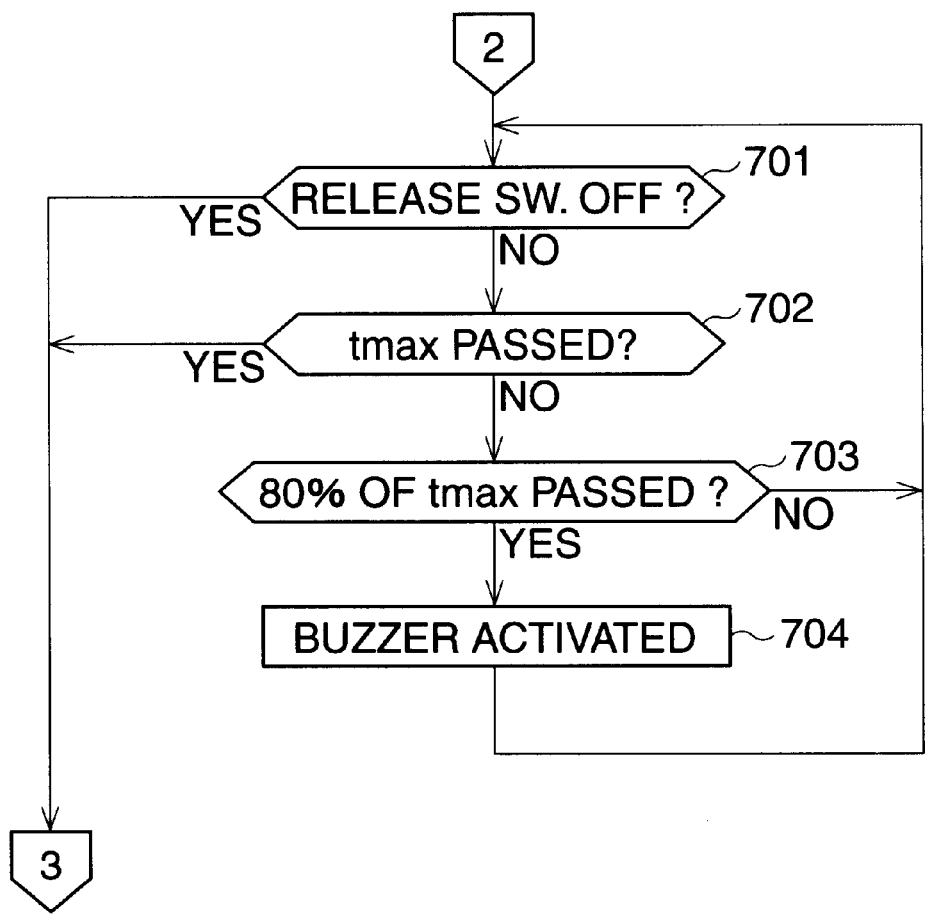
FIG. 12 is a main part of a flow chart of a photographing operation control routine of a sixth embodiment.

FIG. 12 is a main part of a flow chart of a photographing operation control routine of a sixth embodiment, and corresponds to the flow chart shown in FIG. 8C, similarly to the flow charts shown in FIGS. 9, 10 and 11. The other constructions are the same as that of the second embodiment.

In Step 701, it is determined whether the release switch is switched to 'OFF'. When the release switch is switched to 'OFF', the process goes to Step 316 (see FIG. 8B), and when the release switch is kept 'ON', Step 702 is executed, in which it is determined whether the maximum exposure period $t_{max}$ has passed since the shutter 25 is open in Step 313 (see FIG. 8A). When the maximum exposure period $t_{max}$ has not passed, Step 703 is executed in which it is determined whether 80% of the maximum exposure period $t_{max}$ has passed. When 80% of the maximum exposure period $t_{max}$ has not passed, the process goes back to Step 701, and when 80% of the maximum exposure period $t_{max}$ has passed, the process goes to Step 704. Namely, a buzzer sound is output by the piezoelectric buzzer 56, and the process goes back to Step 701. The buzzer is continuously activated while Steps 701 through 704 are executed.

When the release switch is switched to 'OFF' during the buzzer sound is activated, the process goes from Step 701 to Step 316 (see FIG. 8B). Similarly, when it is determined in Step 702 that the maximum exposure period $t_{max}$ has passed during the buzzer sound is activated, the process goes to Step 316.

Therefore, according to the sixth embodiment, the effect, which is the same as that of the second embodiment, is obtained. Further, in the sixth embodiment, since the bulb photographing operation is terminated without activating the buzzer when the maximum exposure period $t_{max}$ has passed, the control of the device is simpler in comparison with the second embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications Nos. 11-249748 and 11-249767 (both filed on Sep. 3, 1999) which are expressly incorporated herein, by reference, in their entireties.

What is claimed is:

1. An exposure period control device for an electronic still camera, comprising:
   a thermo sensor that senses a temperature of an imaging device; and
   a maximum exposure period control processor that limits a maximum exposure period for an automatic exposure control to a value corresponding to said temperature, wherein said maximum exposure period $t_{max}$ corresponding to said temperature T° C. is $$t_{max} = t_0 \times (½)^{T/Th}$$

wherein said maximum exposure period is $t_0$ at 0° C., and $7 \leq Th \leq 11$.

2. A device according to claim 1, wherein said temperature is that of a surface of said imaging device.

3. A device according to claim 2, wherein said surface is a rear surface positioned behind a light receiving surface of said imaging device.

4. An exposure period control device for an electronic still camera, which can perform a long-time exposure, said exposure period control device comprising:
   a temperature sensing processor that senses a temperature of an environment where said electronic still camera is used; and
   a warning processor that obtains a maximum exposure period for said long-time exposure, in accordance with said temperature, to output a warning signal corresponding to said maximum exposure period,
   wherein said warning processor outputs said warning signal when said maximum exposure period has passed during said long-time exposure.

5. A device according to claim 4, wherein said warning signal comprises a buzzer sound.

6. A device according to claim 4, wherein said warning signal comprises a visual warning indication.

7. A device according to claim 4, wherein said warning signal comprises a visual warning indication.

8. A device according to claim 4, further comprising an exposure stop processor that terminates the exposure operation when said maximum exposure period has passed during said long-term exposure.

9. A device according to claim 4, wherein said temperature sensing processor comprising a thermo sensor sensing a temperature of an imaging device.

10. A device according to claim 4, wherein said maximum exposure period control processor decreases said maximum exposure period as said temperature increases.

11. A device according to claim 10, wherein said maximum exposure period $t_{max}$ corresponding to said temperature T° C. is $$t_{max}=t_0\times(1/2)^{T/Th}$$

wherein said maximum exposure period is $t_0$ at 0° C., and $7 \leq Th \leq 11$.

12. An exposure period control device for an electronic still camera, which can perform a long-time exposure, said exposure period control device comprising:

a temperature sensing processor that senses a temperature of an environment where said electronic still camera is used; and a warning processor that obtains a maximum exposure period for said long-time exposure, in accordance with said temperature, to output a warning signal corresponding to said maximum exposure period, wherein said warning processor outputs, before said maximum exposure period has passed, a preliminary warning signal indicating that said maximum exposure period is approaching.

13. A device according to claim 12, wherein said warning processor outputs said warning signal when said maximum exposure period has passed during said long-time exposure.

14. A device according to claim 13, wherein said warning signal comprises a buzzer sound.

15. A device according to claim 13, wherein said warning signal comprises a visual warning indication.

16. A device according to claim 12, wherein said preliminary warning signal comprises buzzer sound.

17. A device according to claim 12, further comprising an exposure stop processor that terminates the exposure operation when said maximum exposure period has passed during said long-term exposure.

18. A device according to claim 12, wherein said temperature sensing processor comprising a thermo sensor sensing a temperature of an imaging device.

19. A device according to claim 12, wherein said maximum exposure period control processor decreases said maximum exposure period as said temperature increases.

20. A device according to claim 12, wherein said maximum exposure period $t_{max}$ corresponding to said temperature T° C. is $$t_{max}=t_0\times(1/2)^{T/Th}$$

wherein said maximum exposure period is $t_0$ at 0°C., and $7 \leq Th \leq 11$.

* * * * *